US010844804B2

(12) United States Patent
Pursifull et al.

(10) Patent No.: US 10,844,804 B2
(45) Date of Patent: Nov. 24, 2020

(54) METHOD AND SYSTEM FOR FUEL INJECTOR BALANCING

(71) Applicant: Ford Global Technologies, LLC, Dearborn, MI (US)

(72) Inventors: Ross Dykstra Pursifull, Dearborn, MI (US); Joseph Thomas, Farmington Hills, MI (US); David Oshinsky, Trenton, MI (US); Michael Uhrich, Wixom, MI (US); Paul Hollar, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/355,380

(22) Filed: Mar. 15, 2019

(65) Prior Publication Data

US 2020/0291886 A1 Sep. 17, 2020

(51) Int. Cl.
*B60T 7/12* (2006.01)
*F02D 41/38* (2006.01)
*F02M 65/00* (2006.01)
*F02D 41/00* (2006.01)

(52) U.S. Cl.
CPC ......... *F02D 41/38* (2013.01); *F02D 41/0085* (2013.01); *F02M 65/003* (2013.01); *F02D 2041/389* (2013.01); *F02D 2200/0604* (2013.01)

(58) Field of Classification Search
CPC ... B60W 2510/0619; B60W 2710/0622; F02B 19/1052; F02B 19/1085; F02D 19/024; F02D 33/00; F02D 35/0046; F02D 35/0092; F02D 41/0002; F02D 41/0025; F02D 41/0052
USPC ........................................ 701/101, 103, 105
See application file for complete search history.

(56) References Cited

U.S. PATENT DOCUMENTS 7,523,743 B1 4/2009 Geveci et al.
7,552,717 B2 6/2009 Dingle
9,593,637 B2 3/2017 Surnilla et al.
2016/0177860 A1* 6/2016 Pursifull ................ F02B 43/12 123/294
2016/0363104 A1* 12/2016 Sanborn ............. F02D 41/3094
(Continued)

OTHER PUBLICATIONS

Surnilla, G. et al., "Method and System for Fuel Injector Balancing," U.S. Appl. No. 16/156,705, filed Oct. 10, 2018, 40 pages.
(Continued)

*Primary Examiner* — John Kwon
(74) *Attorney, Agent, or Firm* — Geoffrey Brumbaugh; McCoy Russell LLP

(57) ABSTRACT

Methods and systems are provided for reducing errors in estimated fuel rail pressure incurred at the time of a scheduled injection event due to engine-driven cyclic fuel rail pressure changes. In one example, a pulse-width commanded during a scheduled injection event is determined as a function fuel rail pressure samples collected over a moving window that is customized for the corresponding fuel injector. In another example, the commanded pulse-width is determined as a function of an average fuel rail pressure sampled during a quiet zone of injector operation and predicted fuel rail pressure altering events occurring between the quiet zone and the scheduled injection event.

8 Claims, 8 Drawing Sheets

(56) References Cited

U.S. PATENT DOCUMENTS

2020/0116099 A1 * 4/2020 Surnilla .............. F02D 41/3863

OTHER PUBLICATIONS

Pursifull, R. et al., "Method and System for Fuel Injector Balancing," U.S. Appl. No. 16/355,319, filed Mar. 15, 2019, 68 pages.

* cited by examiner

METHOD AND SYSTEM FOR FUEL INJECTOR BALANCING

FIELD

The present description relates generally to methods and systems for calibrating a fuel injector of an engine so as to balance fuel delivery between all engine fuel injectors.

BACKGROUND/SUMMARY

Engines may be configured with direct fuel injectors (DI) for injecting fuel directly into an engine cylinder and/or port fuel injectors (PFI) for injecting fuel into an intake port of an engine cylinder. Fuel injectors often have piece-to-piece variability over time due to imperfect manufacturing processes and/or injector aging, for example. Over time, injector performance may degrade (e.g., injector becomes clogged) which may further increase piece-to-piece injector variability. As a result, the actual amount of fuel injected to each cylinder of an engine may not be the desired amount and the difference between the actual and desired amounts may vary between injectors. Variability in fuel injection amount between cylinders can result in reduced fuel economy, increased tailpipe emissions, torque variation that causes a lack of perceived engine smoothness, and an overall decrease in engine efficiency. Engines operating with a dual injector system, such as dual fuel or PFDI systems, may have even more fuel injectors (e.g., twice as many) resulting in greater possibility for injector variability. It may be desirable to balance the injectors so that all injectors have a similar error (e.g., all injectors at 1% under fueling).

Various approaches estimate injector performance by correlating a pressure drop across a fuel rail coupled to an injector with a fuel mass injected by the corresponding injector. One example approach is shown by Surnilla et al. in U.S. Pat. No. 9,593,637. Therein, a fuel injection amount for an injector is determined based on a difference in fuel rail pressure (FRP) measured before injector firing and FRP after injector firing. Another example approach is shown by Geveci et al. in U.S. Pat. No. 7,523,743. Therein, fuel rail pressure sensor inputs and engine speed sensor inputs are used to determine multiple pressure values at each tooth position over a single engine cycle. An average or mean of the multiple pressure values is then used to calculate individual injector errors. Once individual injector errors are calculated, engine operation may be adjusted to balance injector errors.

However, the inventors herein have recognized that a residual cylinder fuel maldistribution may persist even after compensating for injector variance because there are causes other than injector variability that result in cylinder-to-cylinder maldistribution. That is, even after learning and accounting for individual injector errors, there may a higher than desired variation in injector error between injectors. This residual cylinder fuel maldistribution may arise from an engine cyclic fuel rail pressure variation that is triggered by the action of cam lobes of a high pressure direct injection fuel pump (herein referred to as the DI pump) powering direct injectors. In particular, the fuel rail pressure variation may have a repeating pattern over one engine cycle. For example, in the case of a V8 engine with a 3 lobe pump, the injectors generate 8 evenly spaced pressure drops onto a fuel rail pressure over a 720° crank angle period. The DI pump creates 3 evenly spaced pressure increases on the fuel rail pressure over the 720° crank angle period. This creates a pattern on the fuel rail pressure with a 720° repeat. Typically, the fuel rail pressure (FRP) is estimated once per cylinder event period (90° in the case of an even-firing 8 cylinder engine) and then used to schedule a fuel injection into the future. As a result, the measured FRP is out of phase with the actual pressure at the time of the scheduled injection. The phase difference furthermore varies with engine configuration, including the number of engine cylinders as well as the number of cam lobes of the DI pump. The engine cyclic pattern on the fuel rail pressure consequently generates an unintended engine cycle fuel maldistribution. For example, if the injection is scheduled based on a fuel rail pressure estimated during a pump stroke peak, or while the pressure was cyclically rising but the injection occurs during a pressure trough, fuel may be under-delivered on the scheduled injection event. On the other hand, if the injection is scheduled based on a fuel rail pressure estimated during a pump stroke trough, or while the pressure was cyclically falling but the pressure peaked during the actual injection, fuel may be over-delivered on the scheduled injection event.

In one example, the issues described above may be addressed by a method for an engine comprising: estimating an average fuel rail pressure at a scheduled injection event based on an initial fuel rail pressure, sampled and averaged over a quiet period of a fuel injector, and a predicted change to the initial pressure from pressure altering engine events occurring between the quiet period and the scheduled injection event; and adjusting a pulse-width commanded at the scheduled injection event based on the estimated average fuel rail pressure. In this way, fuel rail pressure changes corresponding to a fuel injection event can be determined more reliably, allowing for improved injector balancing.

As an example, fuel rail pressure (FRP) may be sampled at a defined sampling rate which may be synchronous or asynchronous with engine events. Each sample may include a fuel rail pressure estimate and an associated engine angle/position. For each (upcoming) scheduled injection event at a given direct fuel injector, a quiet period of the injector may be defined, and only fuel rail pressure samples collected in the quiet period of the injector may be used for further processing. Specifically, samples collected during an injection event for a given injector may be discarded. In addition, samples collected for a calibrated threshold duration (e.g., 5 msec) after the injection ends may be discarded. To implement the processing, samples collected on both PIP edges are then buffered. Samples corresponding to the quiet period of an injector may include samples collected after the threshold duration and before the start of a subsequent injection event. Further, the DI pump may be disabled during this quiet period. The samples collected over the quiet period of the injector are averaged to generate an initial average pressure. An updated average fuel rail pressure at the time of the upcoming scheduled injection event at the given injector is then predicted based predicted changes in fuel rail pressure due to intermediate injector and fuel pump events occurring between the end of the quiet period, and the end of the scheduled injection event. For example, the predicting may account for decreases in fuel rail pressure due to intermediate injection events from other injectors, as well as increases in fuel rail pressure due to intermediate pump stroke events. The updated average future pressure during an injection estimate is then used to calculate a pulse-width command for the given injector at the time of the scheduled (future) injection event. Estimating the injection pressure into the future from a high confidence measure in the present allows for the use of a more reliable pressure value for scheduling of fuel injection, specifically, for fuel pulse-width computation.

The technical effect of predicting a fuel rail pressure for future fuel injections of an engine based on an average fuel rail pressure measured during an injector quiet period, and further based on intermediate injector and pump events, is that fuel rail pressure caused maldistribution between cylinders can be better ameliorated, thereby further balancing the injectors. In addition, by averaging fuel rail pressure sampled over a quiet period of an injector, any aliasing errors and resolution errors caused by pressure ringing following an injection event can be reduced. By updating the estimated future fuel rail pressure during future, scheduled injection events to account for pressure variations resulting from pump stroke and injection events, an actual pressure at the time of a scheduled injection event can be estimated more reliably and accurately. For example, cyclically rising pressure from a fuel pump stroke and cyclically falling pressure from an injection can be better accounted for. As a result, over- and under-fueling errors resulting from a timing of fuel pressure capture relative to the pump stroke are reduced. By relying on a predicted pressure value that is based on the average pressure values estimated during the quiet period of an injector, fuel rail pressures and corresponding fuel injection volumes for fuel injectors can be estimated more accurately and reliably. This allows for improved injector balancing and a reduction in unintended cylinder-to-cylinder injector maldistribution.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
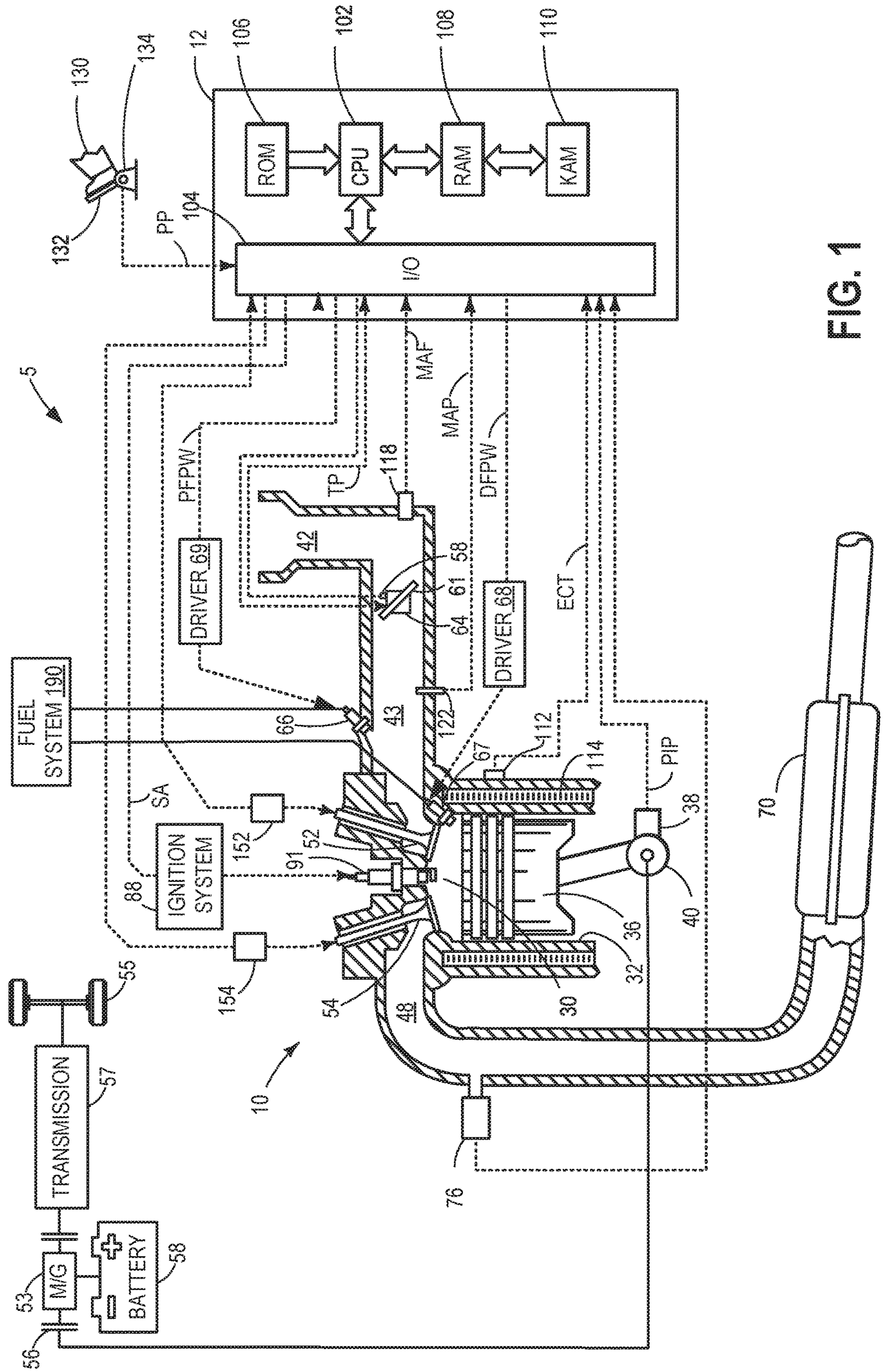
FIG. 1 shows a schematic depiction of an example propulsion system including an engine.
Figure 2:
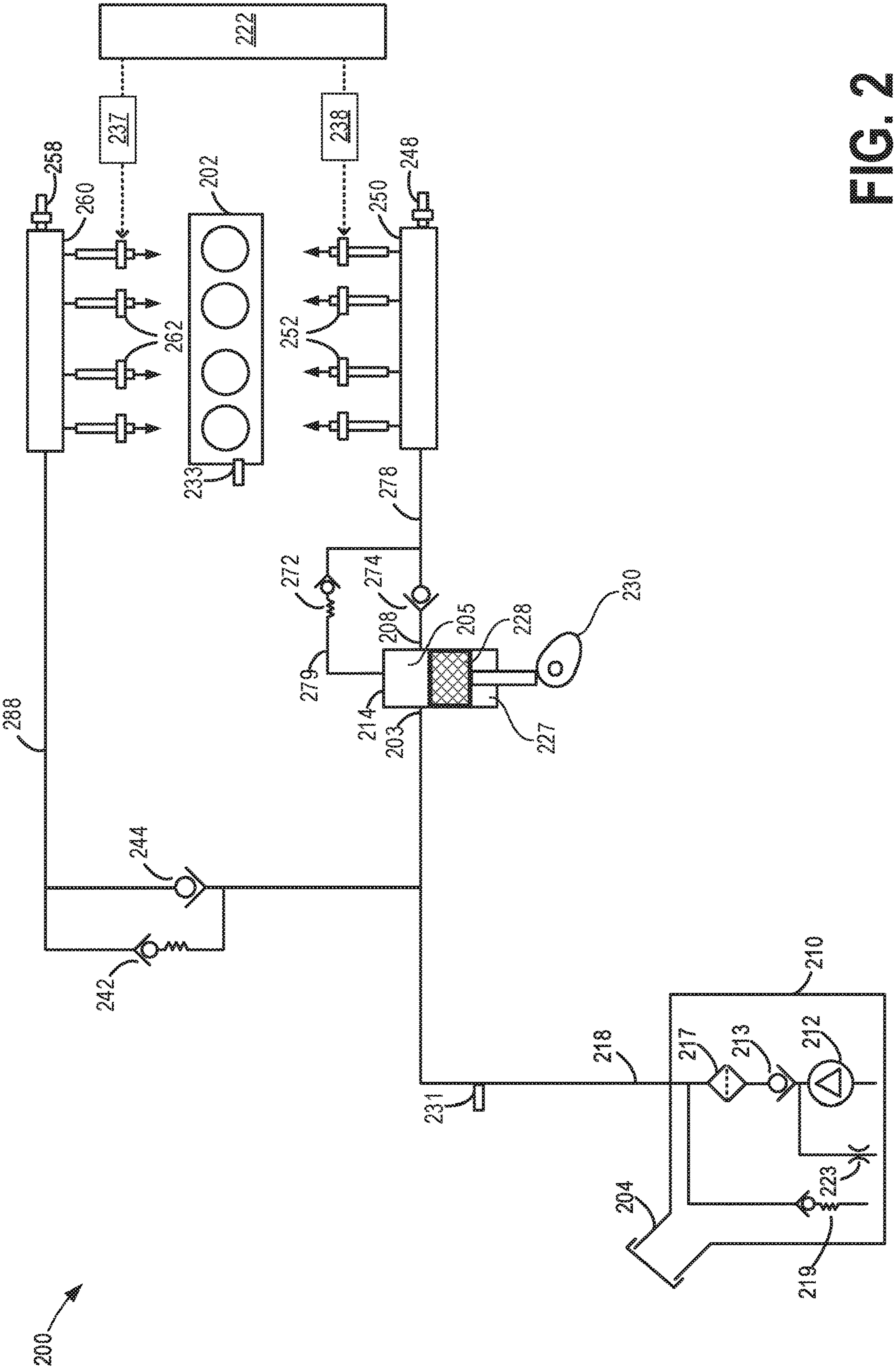
FIG. 2 shows an example fuel system coupled to the engine of FIG. 1
Figure 9:
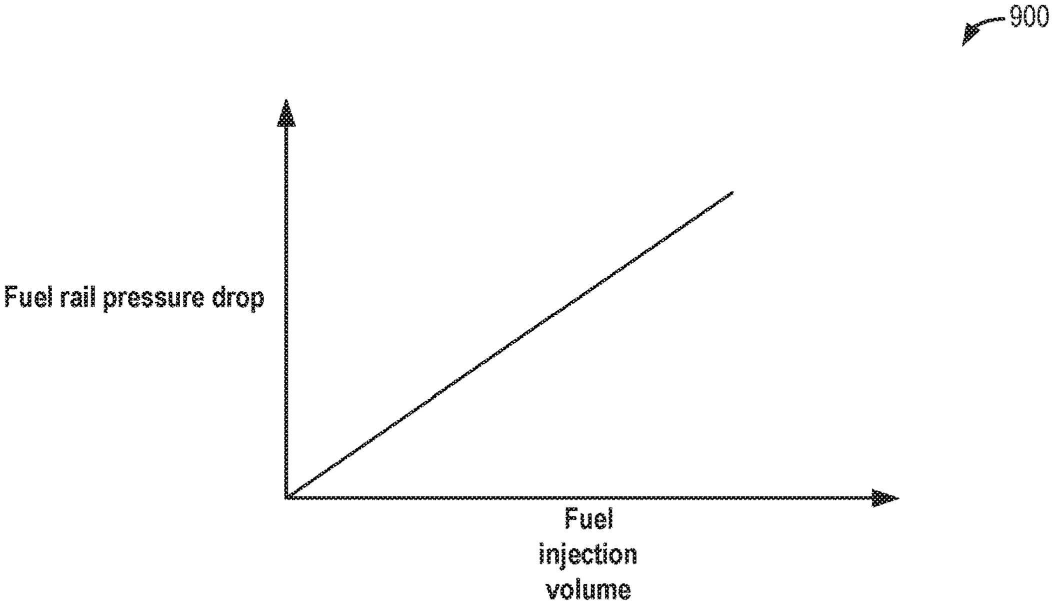
FIG. 9 depicts a graphical relationship between a fuel rail pressure drop and injected fuel quantity at a fuel injection system.
Figure 6:
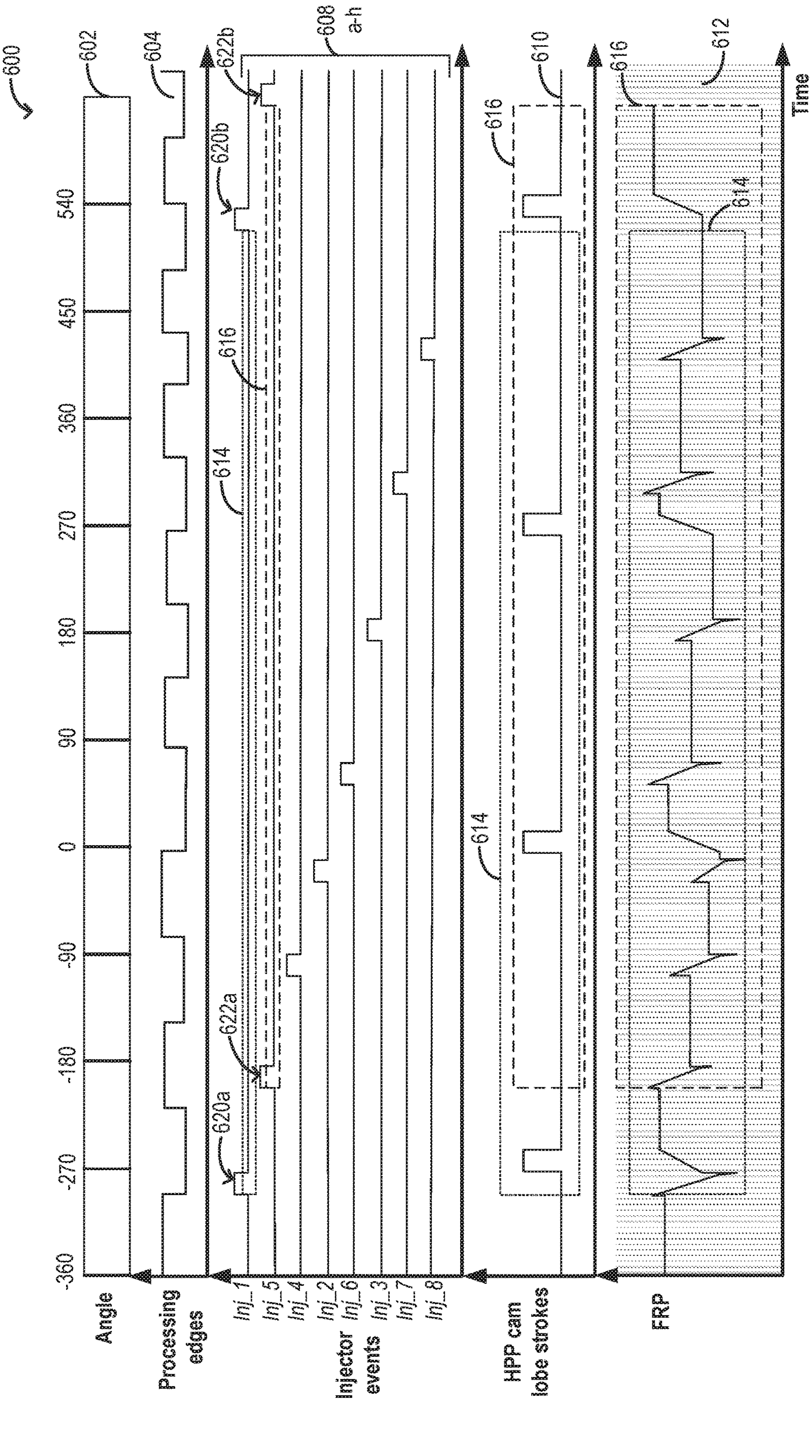
FIG. 6 depicts an example map for averaging fuel rail pressure sampled over a moving window, in accordance with the method of FIG. 4.
Figure 7:
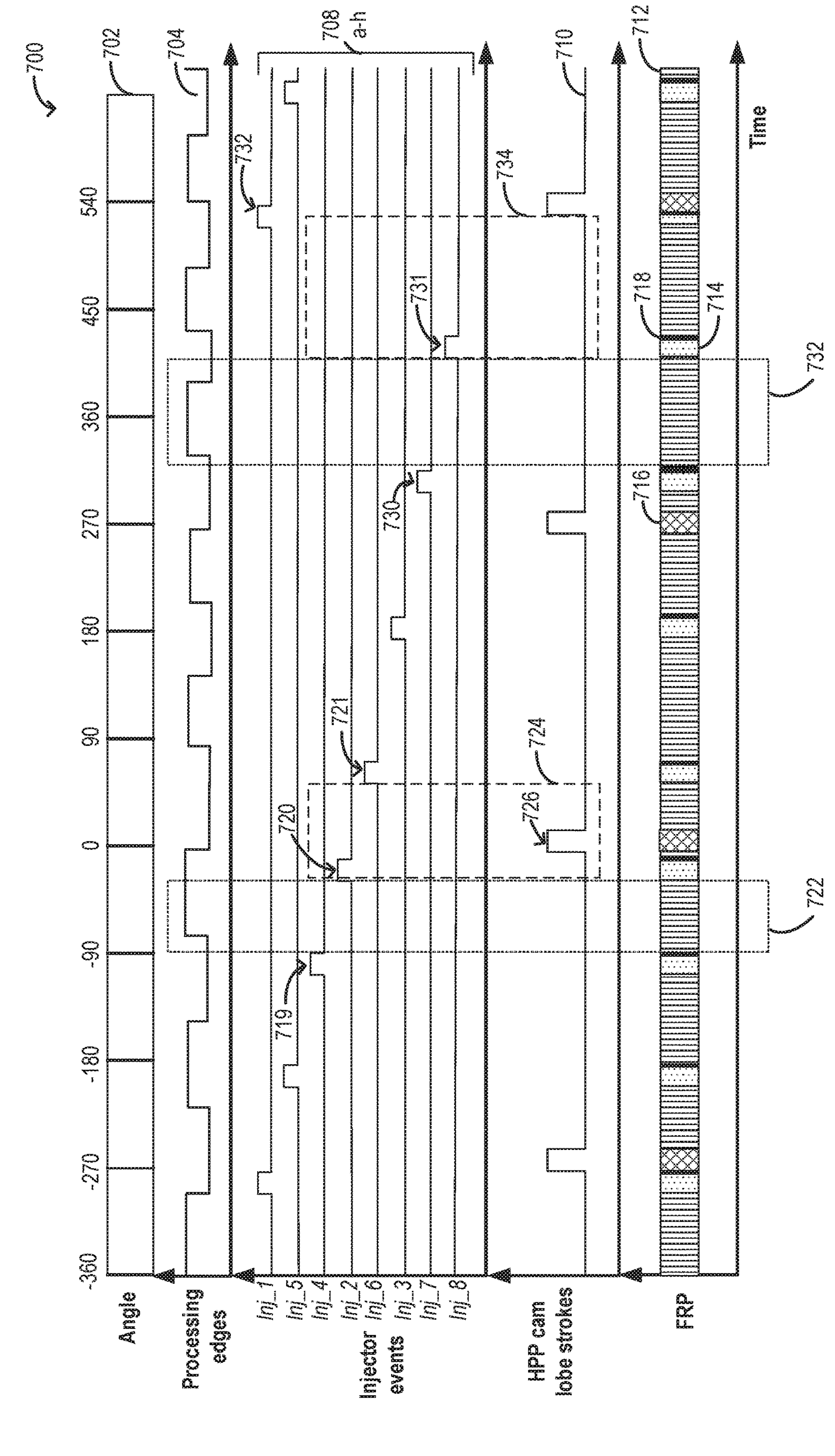
FIG. 7 depicts an example map for averaging fuel rail pressure sampled in a fuel rail quiet period, in accordance with the method of FIG. 5.
Figure 8:
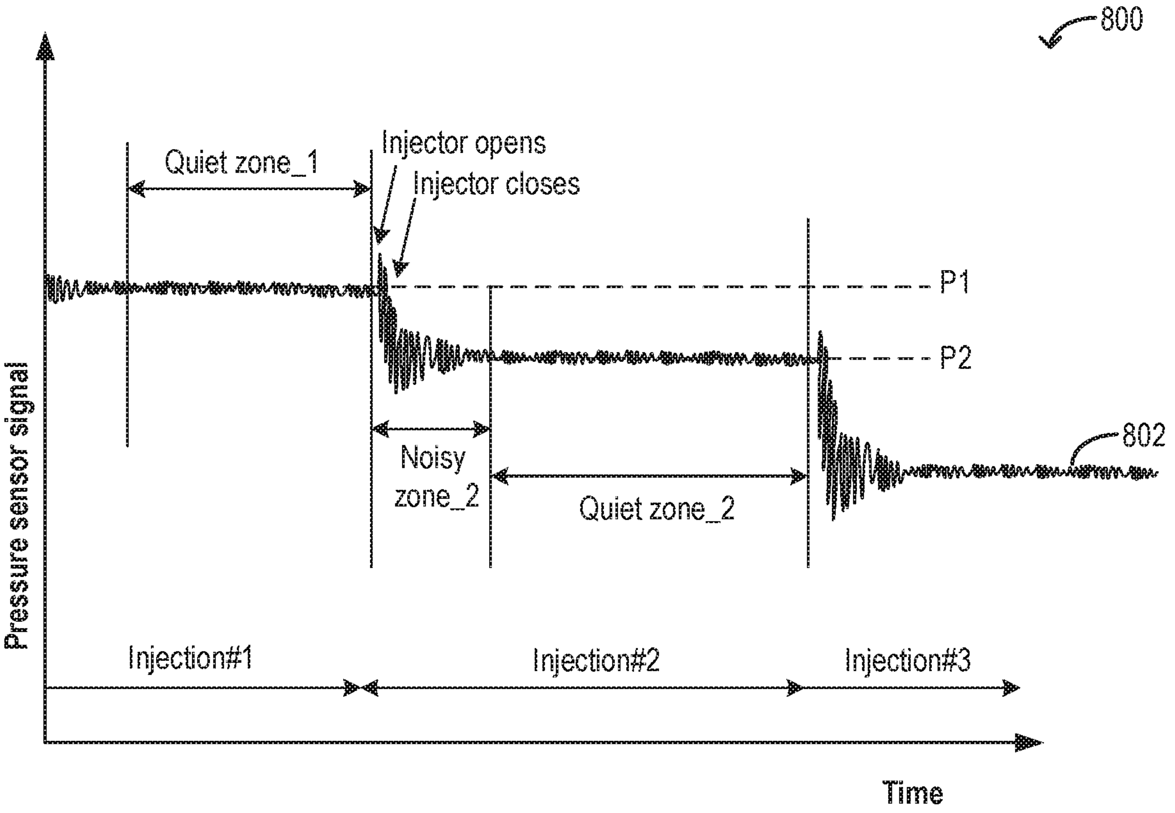
FIG. 8 shows an example map depicting a quiet period of a fuel rail.

The following description relates to systems and methods for calibrating fuel injectors in an engine, such as the fuel system of FIG. 2 coupled in the vehicle system of FIG. 1. The fuel injectors may be direct and/or port fuel injectors. A controller may be configured to sample fuel rail pressure at a predefined sampling rate during fueled engine operation. The controller may then perform a control routine, such as the example routine of FIG. 3, to learn an average fuel rail pressure for scheduling fueling on an injection event based on a moving window average (FIG. 4, FIG. 6) or based on a quiet period average (FIG. 5, FIG. 7, FIG. 8). After commanding fuel to an injector, the controller may further correlate changes in fuel rail pressure at each injection event with a volume of injection (FIG. 9) to learn individual injector errors. Injector commands are subsequently adjusted to balance injector errors.

It will be appreciated that as used herein, injector balancing does not refer to correcting injectors to an absolute standard. Instead, injector balancing as used herein refers to making the injectors inject alike based on what is learned from their resulting pressure drops during injection and the measured/predicted pressures during injection.

FIG. 1 shows a schematic depiction of a spark ignition internal combustion engine 10 with a dual injector system, where engine 10 is configured with both direct and port fuel injection. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 for delivering injected fuel directly therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. An example fuel system including fuel pumps and injectors and fuel rails is elaborated with reference to FIG. 2.

Returning to FIG. 1, exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 140 of engine 10 and electric machine 53 are connected via a transmission 57 to vehicle wheels 55 when one or more clutches 56 are engaged. In the depicted example, a first clutch 56 is provided between crankshaft 140 and electric machine 53, and a second clutch 56 is provided between electric machine 53 and transmission 57. Controller 12 may send a signal to an actuator of each clutch 56 to engage or disengage the clutch, so as to connect or disconnect crankshaft 140 from electric machine 53 and the components connected thereto, and/or connect or disconnect electric machine 53 from transmission 57 and the components connected thereto. Transmission 54 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 58 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 61, fuel injectors 66 and 67, spark plug 91, etc., to adjust engine operation based on the received signals and instructions stored on a memory of the controller. As one example, the controller may send a pulse width signal to the port injector and/or the direct injector to adjust an amount of fuel delivered to a cylinder.

FIG. 2 schematically depicts an example embodiment 200 of a fuel system, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIGS. 3-5.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of port injectors 262 (herein also referred to as a second injector group). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a Bosch HDPS high pressure pump, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222. On a three or six-cylinder engine with a DI pump driven with a 3 lobe cam, a 240°, 480°, or 720° averaging period would be appropriate. On a 4 or 8-cylinder engine with a DI pump driven by a 4 lobe cam, a 180°, 360°, 540°, or 720° averaging period would be appropriate because each would contain a given number of pressure rises due to pump strokes and pressure drops due to injection events.

Based on the configuration of the engine as well as the configuration of the HPP (such as the number and position of cam lobes), the HPP may apply a repeating pattern onto the fuel rail pressure. For example, an 8 cylinder engine with a 3 lobe pump repeats its FRP pattern every 720°. As another example, an 8 cylinder engine with a 4 lobe pump repeats its FRP pattern every 180°. A 6 cylinder engine with a 3 lobe pump repeats its pattern every 240°. A 6 cylinder engine with a 4 lobe pump repeats its FRP pattern every 720°. A 4 cylinder engine with a 3 lobe pump repeats its FRP pattern every 720°. A 4 cylinder engine with a 4 lobe pump repeats its FRP pattern every 180°. A 3 cylinder engine with a 3 lobe pump repeats its FRP pattern every 240°. As elaborated below, by using an integral multiple (e.g., 1, 2, 3, 4. .n) of these repeat periods over which to average the FRP, a more accurate FRP estimate may be achieved. Averaging FRPs over an angle range allows for a substantially constant fuel rail pressure. Averaging over an angle range may be less effective when pressure is ramping between set points or being allowed to fall as the pump is disabled, or when the pressure rises rapidly and the pump is re-enabled.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 (or an engine angular position sensor from which speed is deduced) can be used to provide an indication of engine speed to the controller 222. The indication of engine speed can be used to identify the speed of higher pressure fuel pump 214, since the pump 214 is mechanically driven by the engine 202, for example, via the crankshaft or camshaft. A solenoid controlled valve (not shown) may be included on the inlet side of pump 214. This solenoid controlled valve may have two positions, a first pass through position and a second checked position. In the pass through position, no net pumping into the fuel rail 250 occurs. In the checked position, pumping occurs on the compression stroke of plunger/piston 228. This solenoid valve is synchronously controlled with its drive cam to modulate the fuel quantity pumped into fuel rail 260.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more port injectors 262 and direct injectors 252. For example, during high load conditions, fuel may be delivered to a cylinder on a given engine cycle via only direct injection, wherein port injectors 262 are disabled. In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 222 may be used to send a control signal to the low pressure pump, as required, to adjust the output (e.g., speed, flow output, and/or pressure) of the low pressure pump.

The fuel injectors may have injector-to-injector variability due to manufacturing, as well as due to age. Ideally, for improved fuel economy, injector balancing is desired wherein every cylinder has matching fuel injection amounts for matching fuel delivery commands. By balancing air and fuel injection into all cylinders, engine performance is improved. In particular, fuel injection balancing improves exhaust emission control via effects on exhaust catalyst operation. In addition, fuel injection balancing improves fuel economy because fueling richer or leaner than desired reduces fuel economy and results in an inappropriate ignition timing for the actual fuel-air ratio (relative to the desired ratio). Thus, getting to the intended relative fuel-air ratio has both a primary and secondary effect on maximizing the cylinder energy for the fuel investment.

Fueling errors can have various causes in addition to injector-to-injector variability. These include cylinder-to-cylinder maldistribution, shot-to-shot variation, and transient effects. In the case of injector-to-injector variability, each injector has a different error between what is commanded to be dispensed and what is actually dispensed. As such, fuel injector (not air) balancing may result in an engine's torque evenness. Air and fuel evenness improves emission control.

However, even after injector balancing is performed, a residual cylinder-to-cylinder fuel maldistribution may persist, especially in the case of direct injectors. The inventors herein have recognized that an engine cyclic pattern that appears on fuel rail pressure results in an engine-cyclic, unintended fuel maldistribution. While a pressure drop across an injector can be used to learn a fuel injection volume, and balance injector operations, even small errors in pressure estimation, such as from the engine-cyclic pattern on fuel rail pressure, can result in large errors in fuel mass estimation, aggravating fuel injection maldistribution.

For example, in a V8 engine with a 3 lobe pump (e.g., wherein HPP 214 has 3 different lobes 230), the direct injectors 252 put eight evenly spaced pressure drops onto the fuel rail pressure (over 720° CAD) for DI fuel rail 250. The high pressure direct injection fuel pump puts 3 evenly spaced pressure increases on the rail pressure (over 720°). This creates a pattern on the fuel rail pressure with a 720° repeat. If the fuel rail pressure (FRP) is measured once every 90° CAD, and then used to schedule a fuel injection into the future, the measured FRP may deviate significantly from the actual FRP during the scheduled injection event due to a phase difference. The phase induced difference in FRP can result in fuel mass being over or under-commanded during the scheduled injection event.

Figure 3:
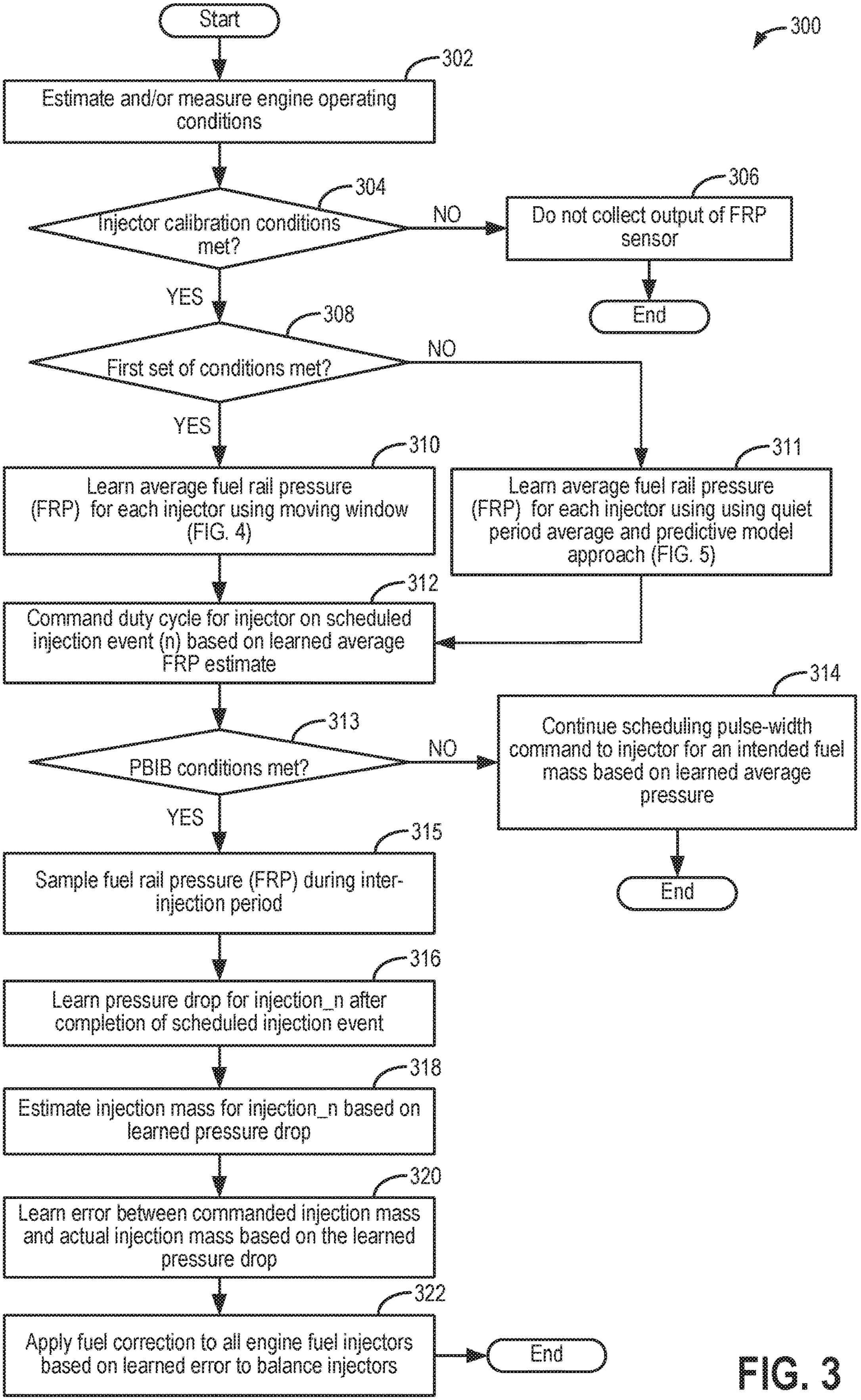
FIG. 3 shows a high level flow chart of an example method for learning an injection volume of an injection event based on sampled fuel rail pressure.
Figure 4:
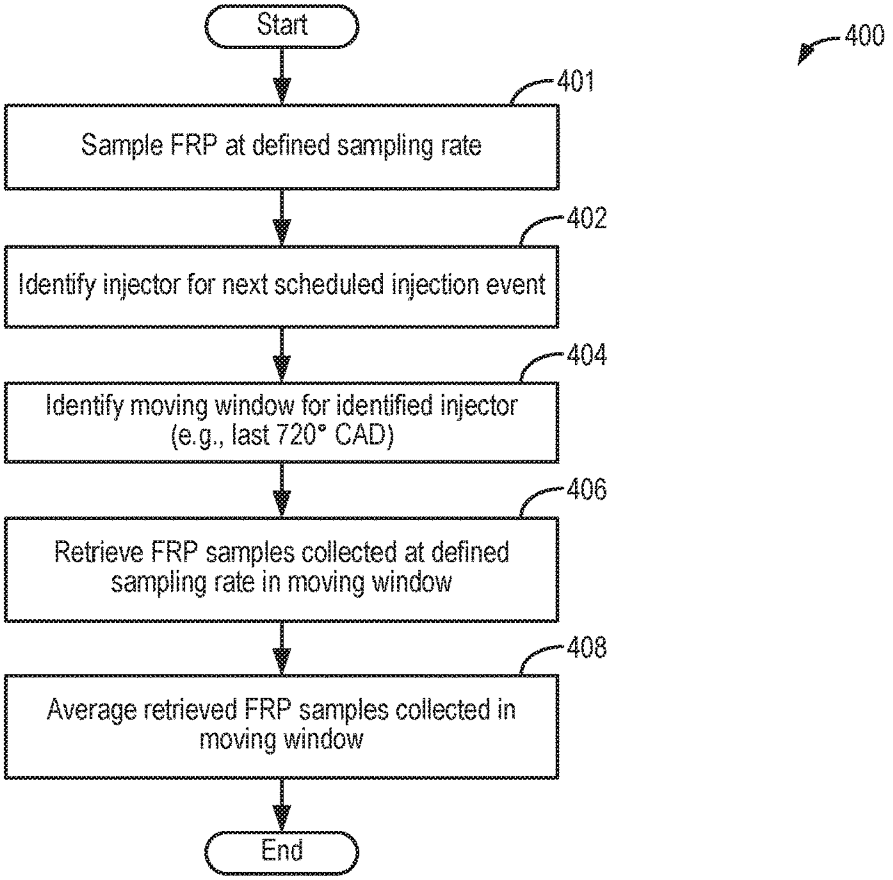
FIG. 4 shows a high level flow chart of an example method for learning an average fuel rail pressure for a scheduled injection event based on pressure sampled over a moving window.
Figure 5:
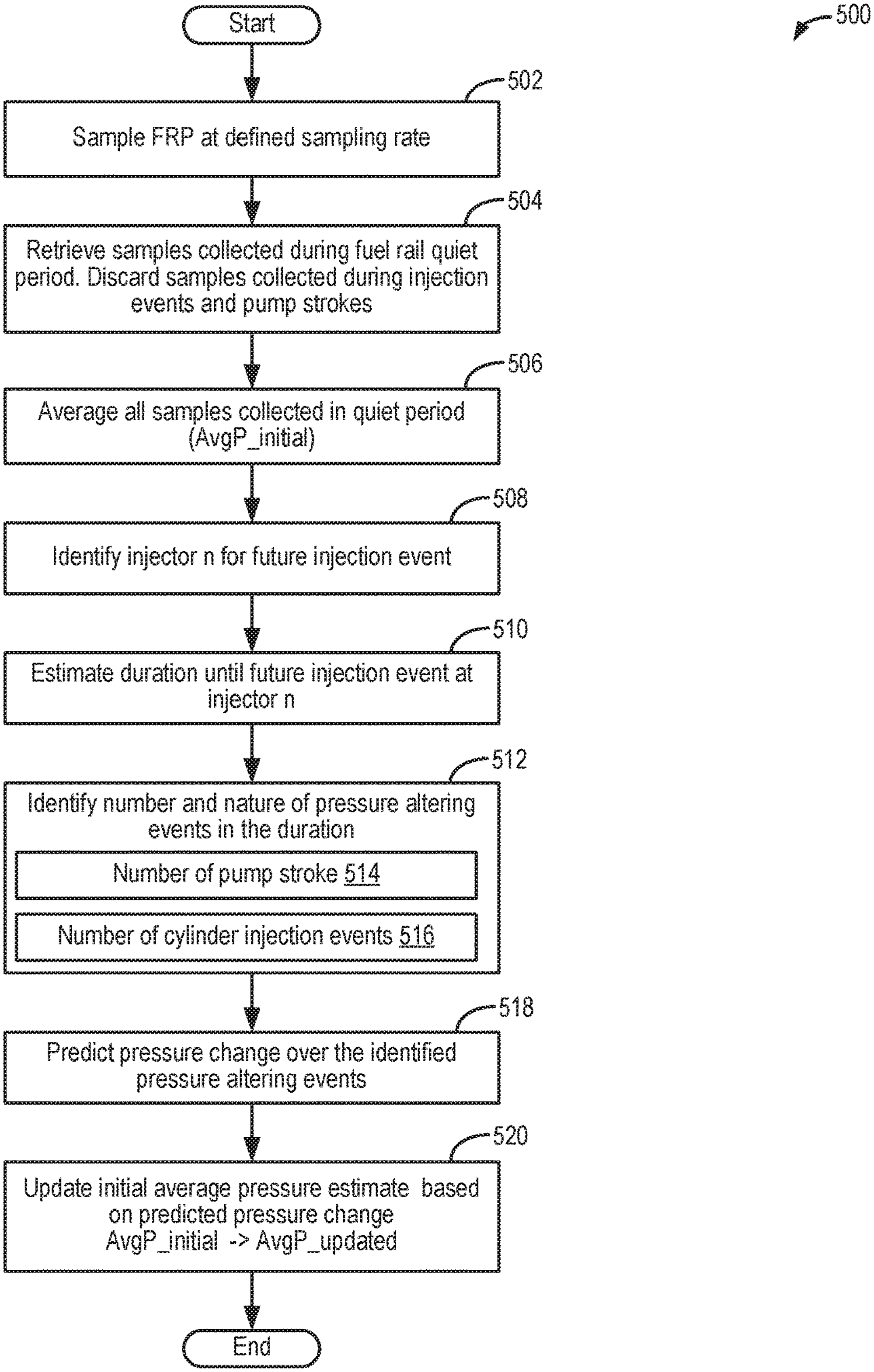
FIG. 5 shows a high level flow chart of an example method for learning an average fuel rail pressure for a scheduled injection event based on pressure sampled over a quiet period of the fuel rail, and further based on predicted cyclic fuel rail pressure changes.

As elaborated herein with reference to FIGS. 3-5, cylinder-to-cylinder fuel maldistribution between direct injectors resulting from cyclic patterns on fuel rail pressure can be compensated for. For example, as indicated with reference to FIG. 4, a moving angular window may be determined for each injector, and fuel rail pressures sampled intermittently over a given moving angular window can be used to estimate an average fuel rail pressure at the time of a scheduled injection event at a corresponding fuel injector. As another example, as indicated with reference to FIG. 5, fuel rail pressures sampled intermittently over a quiet region of an injection event can be used as an initial value from which an average fuel rail pressure at the time of a scheduled injection event at a corresponding fuel injector can be predicted by accounting for interim pressure changes from injection and pump cam stroke events. As such, when an injector is closed at the end of an injection event, the closing of the injector pintle can result in a vibration that causes pressure oscillations or ringing. Fuel rail pressure samples corresponding to a quiet region of an injection event at an injector (herein also referred to as a quiet region of the injector) can be identified by collecting a larger number of fuel rail pressure samples during an injector fueling event, and then discarding a subset of the samples corresponding to a noisy region of the injector having large pressure oscillations. This allows for noise errors to be reduced, improving injector error learning, and error compensation for improved injector balancing. Using the pressure drop as the truth value, the error for each injector may be learned and a fuel pulse commanded to each fuel injector may be adjusted so as to provide a common error on each injector, thereby balancing the injectors.

Turning now to FIG. 3, an example method for accurately estimating an average fuel injection pressure for a fuel injector on a scheduled fuel injection event is shown at 300. The method enables the injection volume dispensed by the fuel injector on the given fuel injection event to be accurately determined and used for balancing injector errors. The method enables an average fuel rail pressure expected at a time when commanding a pulse-width command on an upcoming injection event to be more accurately determined, while reducing aliasing errors from cyclic pressure patterns on the fuel rail. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the method includes estimating and/or measuring engine operating conditions.

These include, for example, engine speed, torque demand, manifold pressure, manifold air flow, ambient conditions (ambient temperature, pressure, and humidity, for example), engine dilution, etc.

At 304, it may be determined if injector calibration conditions are met. Injector calibration conditions being met may include fuel rail pressure sampling conditions being met. In one example, injector calibration conditions are met if a threshold duration and/or distance of vehicle operation has elapsed since a last calibration. As another example, injector calibration conditions are met if the engine is operating fueled with fuel being delivered to engine cylinders via a port or a direct fuel injector. For example, any time the direct injectors are in use, the fuel rails may be sampled, and the injectors can be calibrated and balanced for that condition. While the injector calibration and fuel rail pressure sampling conditions are defined as a function of fuel injection pulse width and FRP, it will be appreciated that other variables could be chosen. If injector calibration conditions (and fuel rail pressure sampling conditions) are not met, then at 306, the method includes not collecting the output of a fuel rail pressure sensor coupled to a direct and/or a port injection fuel rail. The method then ends.

If calibration conditions are met at 304, then at 308, it is determined if a first set of conditions are met for estimating the average fuel rail pressure at the time of a scheduled injection event. The first set of conditions may correspond to conditions where average fuel pressure estimation via use of a moving window is desired (over average fuel rail pressure prediction based on pressure sampled during an injector quiet period). The first set of conditions include, for example, a lower than threshold fuel rail pressure slew rate. A higher than threshold fuel rail pressure slew rate may occur when a high pressure DI fuel pump is disabled to accommodate the data gathering phase of a pressure-based injector balancing routine.

As such, the controller may choose a FRP noise reduction technique based on various considerations. First, the controller may use the most recent FRP sample to compute the requisite pulse-width given the desired injected fuel mass or volume. This approach works well if FRP is largely constant. However, it may be susceptible to error because of the cyclical variation in the FRP signal. Another example approach, known herein as the moving window or "240° lookback" approach, averages the last 240° of one millisecond samples. The 240° lookback approach is appropriate for 3 and six cylinder engines with a 3 lobe cam driving the DI pump. Other angular windows (such as 720° or another window value) are appropriate for other configurations with an alternate combination of number of lobes and cylinders. The angular window is chosen to capture the shortest repeating FRP pattern given consistent injections and pump strokes. Another improved approach for measurement of FRP is formed by measuring and averaging FRP during the injector quiet period. This is useful for computing the requisite injector pulsewidth for a desired injected fuel mass and it is necessary for measuring the inter-injection FRP used to determine the FRP drop due to an injection. Thus, for computing a DI pulse-width, there may be two methods that are used. The controller may use the inter-injection measures when possible, and otherwise the controller may use the lookback approach (which may be for 240° or an alternate window). At high engine speeds or large fuel pulse-widths the DI injection periods can overlap, thus substantially eliminating any injection overlap period. To do Pressure-Based Injector Balancing (PBIB), the controller needs to sample FRP during the inter-injection period. If this FRP measure is available, it may also be used for computing the requisite pulse-width for a given intended fuel mass (or volume) injected. As soon as the condition includes multiple injectors being on simultaneously, an inter-injection period ceases to exist. PBIB learning also ceases. However, DI pulse width scheduling continues with an alternate FRP measurement (e.g. 240° lookback).

If the first set of conditions are met, then at 310, the method includes learning an average fuel rail pressure (FRP) for each injector via FRP samples collected and averaged over a moving window, the window adjusted for each injector. A detailed description of the "moving window" approach is provided at FIG. 4. Else, if the first set of conditions are not met, then at 311, the method includes learning an average fuel rail pressure (FRP) for each injector via FRP samples collected and averaged over a quiet region of an injector, following an injection event at the injector, the average FRP then updated based on predicted rail pressure-affecting events (including injection and pump events) occurring between a time of the averaging and a time of a scheduled injection event from a given injector. Herein, the learning may be performed during an injection event at a first injector, and the learning may be applied to update the fuel rail pressure at the time of a scheduled injection event at a second, different injector. A detailed description of the "quiet period" approach is provided at FIG. 5. It will be appreciated that as used herein, the determined average FRP corresponds to the FRP expected at the fuel rail at the time of a scheduled injection event from a given injector.

From each of 310 and 311, the method moves to 312 to command a duty cycle for the corresponding injector on a scheduled injection event (n) based on the learned average FRP estimated via the moving window approach or via the quiet period approach with the predictive model. For example, the controller may estimate a fuel mass to be delivered to a given cylinder by the corresponding injector on the upcoming scheduled injection event. The controller may then adjust a pulse-width commanded to the injector based on the average fuel rail pressure (which is the estimated average FRP at the time of the scheduled injection event) so as to deliver the target fuel mass.

From 312, the method moves to 313 to determine if pressure based injector balancing (PBIB) conditions are met. PBIB learning may be performed to learn a variation in injector errors. As such, each injector may have an error between the commanded fuel mass to be delivered and the actual fuel mass that was delivered. By learning individual injector errors, the errors may be balanced so that all injectors move towards a common error value. PBIB learning may be performed at selected conditions such as when engine speed is lower than a threshold speed, while injector pulse-width is lower than a threshold, and when multiple injectors are not schedule to deliver concurrently. At high engine speeds or large fuel pulse-widths the DI injection periods can overlap, thus substantially eliminating any injection overlap period. When multiple injectors are on simultaneously, an inter-injection period ceases to exists, also disabling any PBIB learning from being performed.

If PBIB conditions are not confirmed, then at 314, the method includes continuing to schedule a pulse-width command to each fuel injector for an intended fuel mass based on average fuel rail pressure estimated over a moving window, or based on the quiet approach with the predictive model. Else, the pulse-width commanded to the injector may be based on the last sampled FRP.

At 315, responsive to PBIB conditions being met, the method includes sampling fuel rail pressure during an inter-injection period. The inter-injection period includes the period elapsed following initiation of an injection event at a first injector and before injection is initiated at a second injector, firing immediately after the first injector.

At 316, the method includes learning a pressure drop for the scheduled injection event (n) after it is completed. This may include comparing the average FRP estimated for the scheduled injection event with the FRP sensed upon completion of the injection event. Alternatively, the controller may compare the average FRP estimated for injection n relative to the average pressure estimated for an immediately preceding injection event (n−1), with no intermediate injection events. For example, the pressure drop (herein also referred to as DeltaP) may be learned as (AvgP_n−1)-(AvgP_n). As another example, the controller may compare an FRP estimated during an inter-injection period immediately before the firing of the first injector with an FRP estimated during an inter-injection period immediately after the firing at the first injector.

At 318, the method includes estimating the actual fuel mass dispensed at the scheduled injection event n based on the learned pressure drop. In one example, a map correlating pressure drop with injection mass, such as map 900 of FIG. 9, may be used for estimating the dispensed fuel mass. In the depicted example, there is a linear relation between drop in fuel rail pressure over an injection event and the fuel mass dispensed by an injector during that injection event. In other examples, a model, transfer function, look-up table, or algorithm may be used to learn the dispensed fuel mass based on the pressure drop. The actual mass injected is further based on the bulk modulus of the fuel, the fuel density, and the fuel rail volume. In one example, the actual mass injected is determined as per equation (1):

$$\text{Actual mass injected}=(\text{DeltaP}/\text{bulk modulus})*\text{fuel rail volume}*\text{fuel density} \quad (1)$$

At 320, the method includes computing an injector error between the intended injection mass that was commanded (based on the commanded duty cycle pulse width and average FRP at the time of the injection event) and the actual injection mass as computed from the pressure difference.

The computed difference in fuel mass is the injector error that needs to be compensated for in future injections to balance injectors. Specifically, a fuel mass error for the given injector is computed as a difference between the commanded fuel mass (determined based on commanded pulse-width) and the actual fuel mass (determined based on the measured delta pressure). The fuel mass error for the given injector is then compared to the corresponding fuel mass error for other cylinders, or an average fuel mass error for all engine cylinder injectors. For example, the fuel mass error for a first port or direct fuel injector via which fuel is dispensed into a first cylinder during injection_n is compared to a fuel mass error for corresponding port or direct fuel injectors via which fuel is dispensed into each of the remaining engine cylinders over a single engine cycle (where each cylinder is fueled once over the cycle). Based on the differences in fuel mass error between the injectors, a degree of balancing required between injectors is determined. The corrections across all injectors are computed, averaged, and then the average is subtracted from the individual injector corrections to learn the remaining injector-to-injector corrections needed to balance the injectors without affecting the average fueling across the cylinders. In this way, the relative errors between fuel injectors is learned and corrected.

At 322, the method includes applying a fuel correction to at least the fuel injector that dispensed fuel on injection event n based on the learned error to balance errors between injectors. More particularly, a fuel correction is applied to all engine fuel injectors so that all injectors have a common average error. For example, a transfer function of each fuel injector may be updated based on the learned fuel mass error for each injector and an average fuel injector error to reduce the variability in fuel mass injected by each injector for a given pulse width command. The controller may learn a fuel mass error of a given fuel injector based on a sensed change in fuel rail pressure after commanding the pulse-width, and adjust a transfer function of the fuel injector during a subsequent fueling event to bring the learned fuel mass error towards a common fuel mass error across all engine fuel injectors. The method then ends.

It will be appreciated that the errors are not corrected in one single measurement as there may be noise in the measurement. Thus, the controller aims to correct the average error, instead of trying to respond to the system noise. In one example, this is done by making a percent of the requisite correction at each pass, e.g. 20% on the first pass and then taking another measurement and making another 20% correction on the second pass, and so on. In this way, the corrections will result in the average error converging toward zero.

For example, if the controller commanded an injection of 8.000 mg to injector n based on the average FRP (estimated via the moving window or quiet region approach) and from the pressure drop following the injection event at injector n, an actual injection mass of 8.200 mg was determined, then the controller may learn that the given fuel injector overfueled by 0.200 mg. To balance the errors for all injectors, a similar error is determined for each injector and averaged. The 0.200 mg error of injector n is compared to the average error. For example, if the average error is computed to be 0.180 mg, then the fueling of each injector is adjusted to bring the injector error (for each injector of the engine) to the average error. In this case, the command to injector n is adjusted to account for a 0.020 mg surplus. As such, adjusting the injector error to balance the injectors is different from adjusting the error to correct for it. To correct for the error, the injector command would have been adjusted to account for a 0.200 mg surplus.

It will be appreciated that there may be two independent tasks to be accomplished. One is finding FRP accurately to reliably compute the required injection pulsewidth for a future injection. Another function is measuring the pressure drop across an injection. If the injections do not overlap each other and if the DI pump pressure pulses don't interfere, the controller may be able to use the inter-injection FRP averages for compute the injection pressure drop. For predicting FRP, the controller may start with FRP measurements in the quiet zones and update the measurement to estimate a pressure in the future after some more injections or pump strokes have taken place. Alternatively, the controller may use an FRP estimate taken over a defined angle window.

It will be appreciated that there may be two independent tasks to be accomplished. One is finding FRP accurately to reliably compute the required injection pulsewidth for a future injection. Another function is measuring the pressure drop across an injection. If the injections do not overlap each other and if the DI pump pressure pulses don't interfere, the controller may be able to use the inter-injection FRP averages for compute the injection pressure drop. For predicting FRP, the controller may start with FRP measurements in the quiet zones and update the measurement to estimate a pressure in the future after some more injections or pump strokes have taken place. Alternatively, the controller may use an FRP estimate taken over a defined angle window.

In one example, relying on the FRP estimation methods of FIGS. 4 and 5, instead of just sampling a current FRP estimate is advantageous for the purpose of scheduling an injection pulse width since the controller needs to know the FRP during the injection, which occurs in the future. The controller may choose to use the FRP estimated at the beginning of the intended injection event to compute the requisite pulse width, or use the FRP estimated halfway between the beginning and end of the injection in question to compute the requisite pulse width. When possible, the controller may rely on an FRP measured in a quiet zone to initialize or re-initialize the FRP estimation/prediction. However, as engine speed increases, pump stroke angles increase, injection pulse widths increase, or number of injectors that are active increase, causing the quiet zones to become less frequent (or cease to exist). In this condition, the alternative approach for estimating FRP includes the averaging of FRP over an angular window.

One issue during the estimation may be how to filter at a steady value versus how to filter at a value that changes rapidly (fast slew rate). If the value is steady, any filter will do to reduce noise and get an accurate estimate of the mean value. However, if the signal is changing quickly, a heavily filtered value will lag the real signal such that the fueling accuracy may be affected. One way to address this is to use heavy filtering when the signal is largely steady and use light filtering when the signal is slewing. For example, on an 8-cylinder, 3-lobe system, the controller may use an average of FRP over the last 720°. However, when slewing, the controller may choose to shrink the averaging angle to 180° or 90° to have less error caused by a lagging estimate and accept the increased error due to what is regarded as stochastic noise.

Turning now to FIG. 4, method 400 depicts a moving window approach for estimating the average fuel rail pressure at the time of an upcoming scheduled injection event for a given injector. The average fuel rail pressure is estimated for the event that will occur in the future relative to the time of the sampling of the FRP and the estimation of the average FRP. In other words, the average FRP is estimated for a time point occurring not concurrently but later. In one example, the method of FIG. 4 may be performed as part of the method of FIG. 3, such as at 310, responsive to a first set of conditions being met.

At 401, the method includes sampling fuel rail pressure at a defined sampling rate. In one example, the FRP is continuously sampled as long as injector calibration (and FRP sampling conditions) are met at a defined sampling rate, such as 1 sample every 1 millisecond). Samples may be referenced in terms of injection event number, such as from just before a timing of the start of injection of a given injection event (e.g., from before SOI_n where n is the injection event number) to just before the start of injection of an immediately subsequent injection event (SOI n+1). The fuel rail pressure sampled may include a port injection fuel rail pressure when the injection event is a port injection event, or a direct injection fuel rail pressure when the injection event is a direct injection event. In one example, fuel rail pressure is sampled at a 1 kHz frequency. For example, the fuel rail pressure may be sampled at a low data rate of once every 1 millisecond period (that is, a 1 millisecond period, 12 bit pressure sample). In still other examples, the fuel rail pressure may be sampled at a high speed, such as a 10 kHz (that is, a 0.1 millisecond period, 14 bit pressure sample), however the higher sampling rate may not be economical. As a result of the sampling, a plurality of pressure samples are collected for each injection event from each injector, in the order of cylinder firing. Herein, each injection event is defined as a period starting from just before injector opening, and ending just before the opening of another injector on a subsequent injection event. The pressure signal may improve as the number of firing cylinders decreases.

At 402, the method includes identifying the injector for the next scheduled injection event. This may include the immediately next injection event or a scheduled injection event in the future for which a pulse width command needs to be determined and an injector balancing needs to be learned.

At 404, the method includes identifying a moving window for the given injector at which the scheduled injection event will occur. As discussed earlier, fuel rail pressures may exhibit an engine cyclic pattern, the cyclic pattern defined by the configuration of the engine and its associated fuel system (such as based on the number of cylinders, the positioning of cylinders along a bank, and the number of cam lobes of a high pressure fuel pump). The moving window may correspond to a pressure cycle of the cyclic fuel rail pressure pattern. As an example, for a V8 engine with a 3 lobe high pressure fuel pump, the injectors put 8 evenly spaced pressure drops onto the fuel rail pressure over 720° CAD. In such a case, the pressure cycle may be 720° CAD.

At 406, the method includes retrieving the FRP samples collected in the moving window. The FRP samples may have been stored in the controller's memory, and indexed with a time stamp or crank angle/engine position stamp. Retrieving the required FRP samples corresponding to the moving window may include discarding other samples and only keeping a subset of all the collected samples that correspond to the identified moving window. For example, for a given injector scheduled to have injection event n in the engine configuration described above, the controller may retrieve the FRP samples collected in the last 720° CAD prior to the start of the scheduled injection event n. In an alternate example, the controller may identify the moving window for a given injector and then only sample FRP at the defined sampling rate in the identified window.

At 408, the FRP samples collected in the selected moving window are averaged to determine an average FRP at the time of the scheduled injection event. The average may be a statistical average or a weighted average of the FRP samples collected in the moving window corresponding to that injector. The method then ends. As such, the average pressure estimated via the moving window approach is then used to schedule a pulse width command to the given injector at the time of the scheduled injection event.

By averaging the samples collected over a pressure cycle, such as the last 720° moving interval, the engine-cyclic pattern can be removed from FRP, thereby mitigating the resultant unintended cylinder-to-cylinder fuel maldistribution. By using a "last 720°" version of FRP, the 720° repeating pattern that would otherwise produce a 720° fuel variation pattern is removed.

While FRP is being slewed, the controller may temporarily reduce the moving window to 90° or 180°. Alternatively, the controller may use the average value determined from the moving window and then use that to project the FRP into the future based on the intended FRP slew rate. By feeding the fuel injector pulse width computation a value of fuel rail pressure that is free of a cyclic pattern, a more accurate fuel mass injection can be provided as compared to feeding a pulse width based on a most recently sampled FRP estimate (that is, the "latest information").

The moving window may vary with the engine configuration. As another example, for a three lobe cam fuel pump in a 3 and/or 6 cylinder engine, the FRP pressure cycle may be 240° cycle and the average FRP is estimated over a moving 240° window. As yet another example, for a 4 lobe cam fuel pump in a 4 and/or 8 cylinder engine, the FRP pressure cycle may be 180° cycle and the average FRP is estimated over a moving 180° window. As still another example, for a three lobe cam fuel pump in a 4 and/or 8 cylinder engine, the FRP pressure cycle may be 720° cycle and the average FRP is estimated over a moving 720° window. As yet another example, for a four lobe cam fuel pump in a 3 and/or 6 cylinder engine, the FRP pressure cycle may be 360° cycle and the average FRP is estimated over a moving 360° window.

An example implementation of the method of FIG. 4 is now described with reference to the example of FIG. 6. Specifically, map 600 depicts selection of FRP samples for average fuel rail pressure and fuel mass estimation based on a moving window approach. Map 600 depicts processing edges of a PIP sensor at plot 404 and the corresponding engine position in terms of crank angle degree at plot 602. A PIP processing edge is defined as an engine angle based computer processing interrupt that is used to trigger a group of computations. Sensed FRP is shown at plot 612, wherein FRP is sensed by a fuel rail pressure sensor. Samples are collected at lmsec intervals, with each rectangle/box corresponding to a single sample. The operation of each of 8 injectors coupled to 8 different cylinders (labeled 1-8) of an engine is shown at plots 608*a-h*. Pump strokes of each of 3 cam lobes of a high pressure fuel pump are shown at plot 610. In the present example, the injectors are numbered in order of their firing.

The example illustrates the identification of a moving window within the boundaries of which FRP samples are averaged for estimating an average pressure at the time of a scheduled injection event. The average FRP estimated in this manner based on a moving window approach is then used to calculate a duty cycle pulse width command to the corresponding injector at the time of the scheduled injection event. A learned injector error is then balanced with other injectors.

A first injector in cylinder #1 (herein referred to as injector #1) fires on event 620*a* before cylinder #5 fires on event 622*a* in the depicted example. Injector #1 next fires on event 620*b* while cylinder #5 next fires on event 622*b*. Before commanding a fuel pulse width for event 620*b*, the controller may estimate an average fuel rail pressure existing at the time of the scheduled injection event 620*b* in injector #1. To do this, based on the engine configuration, the controller may select a last 720° window for injector #1, depicted herein as window 614 (small dashed line). The window 614 includes at least one stroke of each cam lobe of the HPP, as can be seen by comparing window 614 to plot 610. Window 614 may therefore comprise FRP samples collected from a start of injection event 620*a* (or even slightly before the start of injection event 620*a*, such as for 5 milliseconds before the start of 620*a*) to samples collected over the next 720°, until before the start of injection event 620*b*. A fuel pulse width is then commanded to injector #1 at the time of scheduled injection event 620*b* to provide a desired fuel mass, the pulse width adjusted as a function of the FRP averaged over window 614.

In a similar manner, before commanding a fuel pulse width for event 622*b*, the controller may estimate an average fuel rail pressure existing at the time of the scheduled injection event 622*b* in injector #5. To do this, based on the engine configuration, the controller may select a last 720° window for injector #5, depicted herein as window 616 (large dashed line). The window 616 includes at least one stroke of each cam lobe of the HPP, as can be seen by comparing window 616 to plot 610. Window 616 may therefore comprise FRP samples collected from a start of injection event 622*a* (or even slightly before the start of injection event 622*a*, such as for 5 milliseconds before the start of 622*a*) to samples collected over the next 720°, until before the start of injection event 622*b*. A fuel pulse width is then commanded to injector #5 at the time of scheduled injection event 622*b* to provide a desired fuel mass, the pulse width adjusted as a function of the FRP averaged over window 616.

In the same way, prior to a scheduled injection event in each cylinder, the controller may estimate the average pressure existing in the fuel rail at the time of the scheduled injection event by averaging samples estimated over a last pressure cycle of the engine (herein the last 720° CAD). By relying on FRP averaged over window 614 or 616, rather than relying on an instantaneous FRP estimated immediately prior to the scheduled injection event (620*b* or 622*b*), unintended fueling errors are reduced.

By comparing the average pressure for the scheduled injection event 620*b*, 622*b* with a FRP sensed after the injection event, the controller may estimate an actual injected fuel mass. By comparing this fuel mass to the commanded fuel mass for those injection events, a fuel error for each corresponding injector can be learned. By similarly learning the fuel error for each injector, and adjusting duty cycle pulse width commands for each fuel injector, the injector errors can be balanced so as to provide a common error which is the average of the learned injector errors across all engine cylinders.

Turning now to FIG. 5, method 500 depicts an injector quiet region based approach for estimating the average fuel rail pressure at the time of an upcoming scheduled injection event for a given injector. The average fuel rail pressure is estimated for the event that will occur in the future relative to the time of the sampling of the FRP and the estimation of the average FRP. In other words, the average FRP is estimated for a time point occurring not concurrently but later. In one example, the method of FIG. 5 may be performed as part of the method of FIG. 3, such as at 312, responsive to a first set of conditions for a moving window based approach not being met.

At 502, as at 401, the method includes sampling fuel rail pressure at a defined sampling rate. In one example, the FRP is continuously sampled at a defined sampling rate of 1 sample every 1 millisecond. Samples may be referenced in terms of injection event number, such as from just before a timing of the start of injection of a given injection event (e.g., from before SOI_n where n is the injection event number) to just before the start of injection of an immediately subsequent injection event (SOI n+1). The fuel rail pressure sampled may include a port injection fuel rail pressure when the injection event is a port injection event, or a direct injection fuel rail pressure when the injection event is a direct injection event. In one example, fuel rail pressure is sampled at a 1 kHz frequency. For example, the fuel rail pressure may be sampled at a low data rate of once every 1 millisecond period (that is, a 1 millisecond period, 12 bit pressure sample). In still other examples, the fuel rail pressure may be sampled at a high speed, such as a 10 kHz (that is, a 0.1 millisecond period, 14 bit pressure sample), however the higher sampling rate may not be economical. As a result of the sampling, a plurality of pressure samples are collected for each injection event from each injector, in the order of cylinder firing. Herein, each injection event is defined as a period starting from just before injector opening, and ending just before the opening of another injector on a subsequent injection event. The pressure signal may improve as the number of firing cylinders decreases.

At 504, the method includes retrieving samples collected during a fuel rail quiet period while discarding samples collected during injection events and pump strokes where noise tends to occur. For example, discarding samples collected during injection events includes discarding samples collected over a duration of injector opening. This includes samples collected from just before start of injection (SOI) of an injection event n from a given injector (that is a timing when the injector starts to open to deliver fuel) to end of injection (EOI) of injection event n (that is a timing when the injector has completely closed after having delivered the commanded fuel amount). Samples collected for a threshold duration following EOI_n are also discarded. The threshold duration may be a calibrated duration selected based on the sampling frequency and the fuel rail pressure. The sampling frequency influences the decision, but for a given system, the damping of fuel rail pressure oscillations is constant no matter what the FRP is. One example threshold duration is 5 milliseconds (msec). If more damping geometries are present, the threshold duration may be smaller. A single sensor serving an 8-cylinder engine at 1200 rpm ends up with injections 12.5 msec apart. In one example, where the sampling frequency is once every 1 msec, the threshold duration is 5 msecs. Herein, the threshold duration is calibrated to correspond to a duration over which the fuel rail pressure ringing decays. As such, closure of a pintle of a fuel injector at the EOI timing results in a vibration that causes the fuel rail pressure to oscillate or "ring". The oscillation gradually dampens down, however, if the oscillating fuel rail pressure is taken into account in estimating the average fuel rail pressure over an injection event, the actual fuel rail pressure may be overestimated, resulting in aliasing errors. This may in turn affect the fuel mass that is estimated to have been dispensed by the injector. To reduce these aliasing errors, the FRP samples collected in the noisy zone (that is, zone where pressure is still ringing) are discarded and only the samples collected in the quiet zone (that is, zone where the pressure is not ringing) are used in fuel mass estimation.

At 506, the method includes averaging all the samples collected in the quiet period to determine an initial estimate of average fuel rail pressure (AvgP initial). Herein, the samples collected and averaged may correspond to the quiet period of an injection event at an injector that may be different from the injector for which the estimate is updated for a scheduled injection event. The averaging over the quiet period includes averaging all samples collected after the calibrated duration (that is, since EOI n has elapsed till just before the start of the immediately subsequent injection event (SOC n+1)). Averaging may include estimating a mean value of the selected samples. Alternatively, another statistical value, such as the median, mode, or weighted average of the selected samples may be determined. Further still, the samples may be processed via a filter. By averaging the samples collected in the quiet region of the fuel rail, measurement noise is further reduced, improving the reliability of the pressure estimation. By relying on the quiet period averaged value of FRP as an initial average pressure estimate for estimating a fuel mass, the lower noise allows for a higher accuracy, and improved resolution than a single sample taken without regard to injection or pump timing.

Turning briefly to FIG. 8, map 800 shows an example depiction of selection of FRP samples for initial average injection pressure estimation in a quiet period of an injector. Map 800 depicts a (raw) signal generated by a fuel rail pressure sensor along the y-axis at plot 802, over time along the x-axis. Samples are collected at 1 msec intervals.

A portion of 3 consecutive injection events are depicted. The injection events occur in different cylinders and via distinct injectors. For each injection event, a noisy zone and quiet zone is defined. The noisy zone includes a region of pressure sampling where the injector opens and closes, as well as a duration after injector closing where the pressure oscillates or rings. The quiet zone includes pressure samples for a given injection event outside of the noisy zone and before pressure sampling of a subsequent injection event.

For injection #1, samples collected outside of the corresponding quiet zone (quiet zone_1) are discarded and an average pressure P1 is determined for the samples collected in the quiet zone. For the immediately subsequent injection #2, samples collected in the noisy zone (noisy zone_2) are discarded and an average pressure P2 is determined for the samples collected in quiet zone_2.

If the samples collected in the noisy zones were also included, aliasing errors would have occurred. For example, the average pressure of injection #1 would have been P1', higher than P1. In addition, the average pressure for injection #2 would have been P2'. If the pressure were sampled during the pressure fluctuation, as apparent by inspection, one generally would not get a sample that represents the average pressure between injections. Instead the sampled pressure would bias the average falsely high or low.

Returning to FIG. 5, at 508, the method includes identifying an injector n at which a future scheduled injection event is expected to occur, the future scheduled injection event corresponding to the injection event for which a pulse width command is to be determined. At 510, the method includes estimating a duration until the scheduled injection event. In particular, the controller may estimate an amount of time or crank angle degrees that elapse between a time when the FRP sampled over the quiet period is averaged, and a time of ending of the scheduled injection event.

At 512, the controller may identify a number and nature of fuel rail pressure altering events in the estimated duration (that is, the duration between the estimating of the average FRP based on FRP sampled during the quiet period, and the scheduled injection event). The controller may predict a number of interim pump strokes of a cam lobed high pressure direct injection fuel pump that may occur in that duration at 514. The controller may predict a number of interim injection events that may occur in that duration at 516. The number of interim pump strokes and injection events may be predicted via a model, algorithm, or look-up table that uses the engine configuration and indexed position of the engine at the time of the average FRP estimation as inputs.

At 518, the method includes predicting the pressure change over the identified pressure altering injection or pump stroke events. For example, the injection events may be associated with the pressure drop while the pump stroke events may be associated with a pressure rise. At 520, the initial average pressure estimated based on the FRP samples collected in the quiet period of the injector are updated based on the predicted pressure changes of the pressure altering events expected to occur over the duration until the scheduled injection event at the injector.

The inventors have recognized that cylinder to cylinder fuel maldistribution errors can occur due to a delay between the "most recent" FRP measurement and the actual, future fuel injection event. Accordingly, the controller may predict the fuel pressure at the future scheduled event. If FRP were largely constant, using target pressure or actual pressure to estimate fuel mass would work. However, during pressure based injector balancing, which occurs during falling pressure, fuel mass estimation is confounded by the fuel maldistribution effect. By looking at a specific combination of an injection and pump pattern on a given engine, the controller can start with a most recent average FRP measurement and predict a future FRP during a future scheduled injection event. As such, this approach can provide various advantages over other methods. For example, exhaust gas based methods are not as reliable because it is not known if the cylinder air is distributed evenly. There are injector balance methods that use the electrical current signal from the injector, but they only work on correcting opening time variation. In comparison, the quiet region based approach works over both the ballistic zone and the fully open zone of an injector.

In particular, the FRP pressure drop and the actual fuel mass/volume injected are directly proportional. Even if there is some variation in bulk modulus or density based on fuel composition or temperature, the injections can still be balanced. Balanced means all have the same error. This yield s cylinder-to-cylinder fuel amount consistency. Absolute fuel accuracy is trimmed by the exhaust gas oxygen sensors. While electrical methods are useful, they cannot discover injector differences due to nozzle flow differences form injector to injector.

In the case of an injection event, the controller may predict a reduction in the FRP, and may accordingly reduce the average estimated FRP by a pressure amount (pressure delta) resulting from injecting the intended injection mass as per equation (2) as:

Pressure drop due to an injection=effective bulk modulus/fuel rail volume*fuel mass scheduled for injection/fuel density (2)

In the case where there is one injection between the sample averaged measurement and the future scheduled injection, the FRP to be used to schedule that injection is determined as follows:

FRP after injection[0]=sample average in quiet zone

FRP after injection[1]=FRP after injection[0]−Pressure drop due to injection[1]

FRP after injection[2]=FRP after injection[1]−Pressure drop due to injection[2]

FRP during injection[2]=(FRP after injection[1]−FRP after injection[2])/2

The above algorithm projects the FRP before and after the future scheduled injection event and computes the average of those two values. This pressure estimate is then used for computing the injector pulse width required to deliver the desired fuel mass or volume.

As another example, if a pump stroke occurs before the future scheduled injection, the controller may predict a rise in the FRP, and may accordingly increase the average estimated FRP by a pressure amount (pressure delta) resulting from the pump stroke as per equation (3):

Pressure rise due to a pump stroke=effective bulk modulus/fuel rail volume*fuel mass scheduled for pump/fuel density (3)

If the mass injected over a 720° window of engine rotation is equal to the fuel mass pumped over 720° of engine operation, the fuel rail pressure remains constant (on net over a 720° period but varies within that period). However, in certain cases such as 8 injections per 3 pump strokes, a 720° pressure pattern results causing an unintended fuel misdistribution pattern. And in the case of a declining pressure as occurs via pressure based injector balancing (PBIB), the injection computations use a higher than actual pressure for the computation causing the injections to be richer than expected during this condition, which adds error to the PBIB objective. By using an FRP value that can be predicted appropriately into the future for future scheduled injections, and by relying on the average FRP through an injection rather than the pressure at some time previous to the injection, these errors may be reduced. In particular, cylinder-to-cylinder fuel maldistribution due to a cyclic (e.g., cycling over 720°) FRP pattern is reduced. In addition, richer-than-intended injection while pressure is declining during PBIB is reduced. Similarly, by applying the FRP estimation algorithm which compensates for predicted pressure changes, richer-than-intended injections while FRP is being slewed to a lower target value, and/or leaner-than-intended injections while FRP is being slewed to a higher target value are averted.

An example implementation of the method of FIG. 5 is now described with reference to the example of FIG. 7. Specifically, map 700 depicts selection of FRP samples for average fuel rail pressure and fuel mass estimation based on a quiet region of the injector approach. Map 700 depicts processing edges of a PIP sensor at plot 704 and the corresponding engine position in terms of crank angle degree at plot 702. Sensed FRP is shown at plot 712, wherein FRP is sensed by a fuel rail pressure sensor. Samples are collected at lmsec intervals, with each rectangle/box corresponding to a single sample. The operation of each of 8 injectors coupled to 8 different cylinders (labeled 1-8) of an engine is shown at plots 708*a-h*. Pump strokes of each of 3 cam lobes of a high pressure fuel pump are shown at plot 710. In the present example, the injectors are numbered in the order of firing cylinders.

The example illustrates the estimation of an initial value of average FRP during a quiet period of an injector, and then updating the initial value via a prediction of rail pressure altering events occurring between the initial average estimation and the timing of a scheduled injection event (occurring in the future). The average FRP predicted in this manner based on a quiet region of an injector is then used to calculate a duty cycle pulse width command to the corresponding injector at the time of the scheduled injection event. A learned injector error is then balanced with other injectors.

Consider a scheduled injection event 721, scheduled for injector #6. A controller may calculate an initial estimate of average FRP during a quiet period 722 following injection event 719, occurring at injector #4. This quiet period 722 does not includes FRP sampled during injection event 719. That is, all dot filled samples overlapping with injection event 719 are excluded. Also, FRP sampled over a delay since the end of injection event 719 are also included, represented by the solid black filled samples following injection event 719. FRP sampled starting from the delay since the end of injection event 719 and until the start of injection event 712 are included in the quiet period estimation. During injection event 719, the fuel injector of cylinder #4 (herein referred to as injector #4) is opened for a duration starting from after (approximately) −120°. The duration of opening may be 20°. FRP samples collected during the opening of injector #4 are discarded, as shown by dotted rectangles 714. Samples collected for a threshold duration after the end of the injection are also discarded, as shown by solid black filled rectangles 718. These are samples collected during the noisy zone of the injector. FRP samples collected after the threshold duration and before the start of the next injection in cylinder #2 are kept and averaged. As such, this sampling occurring between −90 to −30°, in quiet region 722 following injection event 720, may constitute the most recent quiet injector period FRP estimate prior to injection event 721.

The average FRP estimated based on the samples collected in quiet region 722 may represent an initial FRP estimate which is then updated. The updating includes identifying all pressure altering events occurring between quiet region 722 and the scheduled injection event 721. In particular, pressure altering events in window 724 are identified and their individual pressure effects on the initial FRP estimate are predicted and used to calculate a final FRP estimate. In this case, window 724 includes an interim injection event 720 and an interim pump event 726. An expected pressure drop due to injection event 720 is predicted. An expected pressure rise due to pump event 726 is also predicted. The predicted pressure rise and expected pressure drop is then added to the initial FRP estimate (from window 722) and used to determine a final FRP estimate expected at the time of scheduled injection event 721. A pulse width is then commanded at the time of injection event 721 that is based on a desired fuel mass to be delivered and the final FRP estimate.

Consider another scheduled injection event 732, scheduled for injector #1. A controller may calculate an initial estimate of average FRP during a quiet period 732 following injection event 730, occurring at injector #7. During injection event 730, the fuel injector of cylinder #7 (herein referred to as injector #7) is opened for a duration after (approximately) 310 CAD. FRP samples collected during the opening of injector #7 are discarded, as shown by dotted rectangles 714. Samples collected for a threshold duration after the end of the injection are also discarded, as shown by solid black filled rectangles 718. If a pump stroke had occurred in quiet period 732, samples collected during that time would also have been discarded, as indicated by hatched rectangles 716. These are samples collected during the noisy zone of the injector. FRP samples collected after the threshold duration and before the start of the next injection in cylinder #7 are kept and averaged. As such, this sampling occurring between ~320 to ~390CAD, in quiet region 732 following injection event 730, may constitute the most recent quiet injector period FRP estimate prior to injection event 732.

The controller may not be able to discard the FRP during the pump pressure rise because the pump stroke itself causes the pressure to rise. The controller may adjust the applied arithmetic for the expected pressure rise, or alternatively, the controller may disable the pump altogether (or disable the pump).

The average FRP estimated based on the samples collected in quiet region 732 may represent an initial FRP estimate which is then updated. The updating includes identifying all pressure altering events occurring between quiet region 732 and the scheduled injection event 732. In particular, pressure altering events in window 734 are identified and their individual pressure effects on the initial FRP estimate are predicted and used to calculate a final FRP estimate. In this case, window 734 includes an interim injection event 731 and no interim pump events. An expected pressure drop due to injection event 731 is predicted and the initial FRP estimate (from window 732) is adjusted to account for the pressure drop, thereby generating a final FRP estimate expected at the time of scheduled injection event 732. A pulse width is then commanded at the time of injection event 732 that is based on a desired fuel mass to be delivered and the final FRP estimate.

Two other pressure altering events include pressure rise due to fuel rail temperature rise which occurs when injection rates are reduced; and fuel rail pressure limiter opens. Both these events, not depicted, occur less frequently.

By comparing the average pressure for the scheduled injection event 721, 732 with a FRP sensed after the injection event (such as in the inter-injection period following injection events 721 and 732 and their corresponding immediately successive injection events), the controller may estimate an actual injected fuel mass for those events. By comparing this fuel mass to the commanded fuel mass for those injection events, a fuel error for each corresponding injector can be learned. By similarly learning the fuel error for each injector, and adjusting duty cycle pulse width commands for each fuel injector, the injector errors can be balanced so as to provide a common error which is the average of the learned injector errors across all engine cylinders.

In this way, by more accurately predicting a fuel rail pressure present at the time of a scheduled injection event, while accounting for cyclic variations in FRP, injector errors may be more reliably learned and balanced. The technical effect of using a pressure cycle (e.g., over 720° CAD) based form of fuel rail pressure in the fuel injector pulse-width computation is that the effect of a cyclic fuel rail pressure variation pattern on fuel distribution is reduced, attenuating the associated unintended cylinder-to-cylinder fuel-air maldistribution. By applying a longer angle moving average window during low fuel rail pressure slew rates, such as while a DI pump is enabled, over- or under estimation of FRP due to the effect of cyclic fuel pump strokes may be averted. By computing a fuel injector pulse width based on a FRP measured during a "quiet time" of an injector (when no injections or pumping is occurring), and by further adjusting that computed sample average pressure to account for predicted changes in pressure resulting from future injections and future pump strokes that will occur prior to the future injection pulse width being scheduled, a more accurate estimate of future FRP for the injection event scheduled in the future may be provided. By relying on the average pressure over an injector quiet period instead of a fuel rail pressure measured previous to the injection, a more accurately projected value is generated. By using a more reliable estimate of average FRP for purposes of pressure feedback control and injector pulse-width measurement, injector accuracy is improved. In addition, a controller may be able to provide better balancing between injectors of all engine cylinders, improving engine fueling accuracy and overall engine performance.

One example method for an engine comprises: for a scheduled injection event at a fuel injector, estimating an average fuel rail pressure as a moving average over an engine cycle since a last injection event at the injector and while each cam lobe of a cam actuated fuel pump has one stroke; and adjusting a pulse-width commanded at the scheduled injection event based on the estimated average fuel rail pressure. In the preceding example, additionally or optionally, the estimating as the moving average is responsive to fuel injector balancing conditions being met. In any or all of the preceding examples, additionally or optionally, the method further comprises learning a fuel mass error of the fuel injector based on the estimated average fuel rail pressure and a fuel rail pressure sensed after the scheduled injection event; and adjusting subsequent engine fueling based on the learned injector error. In any or all of the preceding examples, additionally or optionally, the fuel injector is a first fuel injector, and the learned injector fuel mass error is for the first fuel injector, the method further comprising learning the injector fuel mass error for each remaining engine fuel injector and estimating an average injector fuel mass error based on the injector fuel mass error for each fuel injector, and wherein adjusting subsequent engine fueling includes adjusting fueling from each engine fuel injector based on the learned injector fuel mass error for a given fuel injector relative to the average injector error. In any or all of the preceding examples, additionally or optionally, the learned fuel mass error is further based on each of a fuel bulk modulus, fuel density, and fuel rail volume. In any or all of the preceding examples, additionally or optionally, the adjusting subsequent engine fueling includes updating an injector transfer function for the injector. In any or all of the preceding examples, additionally or optionally, adjusting engine fueling includes updating a transfer function for each fuel injector of the engine based on the learned fuel mass error to provide a common error for each fuel injector. In any or all of the preceding examples, additionally or optionally, the injection event is a direct injection event, and wherein the injector is a direct fuel injector. In any or all of the preceding examples, additionally or optionally, the estimating is responsive to the fuel pump being enabled and wherein the estimating is disabled responsive to the fuel pump being disabled.

Another example method comprises: while a high pressure direct injection fuel pump is enabled, estimating an average fuel rail pressure for a scheduled injection event at a direct fuel injector as a moving average over a pressure cycle since a last injection event at the injector; and adjusting a pulse-width commanded at the scheduled injection event based on the estimated average fuel rail pressure. In any or all of the preceding examples, additionally or optionally, a window of the pressure cycle is selected based on timing of a cam lobe stroke of the high pressure direct injection fuel pump relative to the scheduled injection event. In any or all of the preceding examples, additionally or optionally, the pressure cycle includes an engine cycle since a last injection event at the direct fuel injector and at least one stroke of each cam lobe of the high pressure fuel pump. In any or all of the preceding examples, additionally or optionally, the pressure cycle includes half an engine cycle since a last injection event at the fuel injector.

In any or all of the preceding examples, additionally or optionally, the method further comprises learning a fuel mass error of the fuel injector based on a sensed change in fuel rail pressure after commanding the pulse-width, and adjusting a transfer function of the fuel injector during a subsequent fueling event to bring the learned fuel mass error towards a common fuel mass error across all engine fuel injectors. In any or all of the preceding examples, additionally or optionally, the method further comprises, responsive to the high pressure direct injection fuel pump being disabled, estimating an average fuel rail pressure for a scheduled injection event immediately before the scheduled injection event, and after an immediately preceding injection event is completed.

Another example engine system comprises: a direct fuel injector for delivering fuel from a fuel rail to an engine cylinder; a fuel system including a lift pump and a cam actuated high pressure fuel pump for pressurizing the fuel rail; a pressure sensor coupled to the fuel rail; and a controller with computer-readable instructions stored on non-transitory memory that when executed cause the controller to: prior to a scheduled injection event at the fuel injector, sample fuel rail pressure over a moving window including an engine cycle between the scheduled injection event and an immediately preceding injection event at the fuel injector, the engine cycle including at least one stroke of each cam of the high pressure fuel pump; and command a pulse-width to the fuel injector at the scheduled injection event based on an average fuel rail pressure of the moving window. In any or all of the preceding examples, additionally or optionally, the controller includes further instructions that when executed cause the controller to: learn a fuel mass error of the injector as a function of a difference between the average fuel rail pressure estimated prior to the scheduled injection event and a fuel rail pressure sensed after the scheduled injection event; and adjusting the pulse-width commanded to the injector on a subsequent injection event of the injector based on the learned fuel mass error. In any or all of the preceding examples, additionally or optionally, the injector is a first injector, the engine cylinder is a first cylinder, and the moving window is a first moving window, the system further comprising a second injector coupled to a second cylinder, and wherein the controller includes instructions that when executed cause the controller to: sample the fuel rail pressure over a second moving window, offset from the first moving window, the second moving window including another engine cycle between a scheduled injection event in the second cylinder and an immediately preceding injection event at the second cylinder; and command a pulse-width to the second injector at the scheduled injection event in the second cylinder based on an average fuel rail pressure of the second moving window. In any or all of the preceding examples, additionally or optionally, the controller includes further instructions for: responsive to the high pressure fuel pump being disabled, commanding another pulse-width to the fuel injector at the scheduled injection event based on an average fuel rail pressure sampled over of a quiet region of the fuel injector. In any or all of the preceding examples, additionally or optionally, the commanding includes: sampling the fuel rail pressure from immediately before opening of the injector at a first injection event to immediately before opening of another injector at a second, immediately consecutive, injection event; discarding fuel rail pressure sampled during the first injection event and over a delay since injector closing of the first injection event; averaging remaining fuel rail pressure samples; and commanding the another pulse-width to the injector as a function of the averaged fuel rail pressure.

Another example engine method comprises: estimating an average fuel rail pressure at a scheduled injection event based on an initial fuel rail pressure, sampled and averaged over a quiet period of a fuel injector, and a predicted change to the initial pressure from pressure altering engine events occurring between the quiet period and the scheduled injection event; and adjusting a pulse-width commanded at the scheduled injection event based on the estimated average fuel rail pressure. In any or all of the preceding examples, additionally or optionally, the fuel injector is a first injector, and wherein the scheduled injection event is scheduled at a second fuel injector of the engine. In any or all of the preceding examples, additionally or optionally, the pressure altering engine events include one or more of an injection event from an engine fuel injector other than the first injector, and cam lobe strokes of a high pressure fuel pump fueling all fuel injectors of the engine. In any or all of the preceding examples, additionally or optionally, the estimating includes one or more of estimating a decrease in fuel rail pressure due to the injection event from the engine fuel injector other than the first injector and estimating an increase in fuel rail pressure due to the cam lobe strokes. In any or all of the preceding examples, additionally or optionally, the estimating is responsive to the high pressure fuel pump being enabled. In any or all of the preceding examples, additionally or optionally, the initial fuel rail pressure, sampled and averaged over the quiet period of the fuel injector includes: averaging fuel rail pressure sampled starting after a delay since an end of closing of the first injector on a first injection event and sampled until a start of opening of a third injector on a second injection event, immediately following the first injection event. In any or all of the preceding examples, additionally or optionally, the method further comprises not including fuel rail pressure sampled during the first injection event and within the delay since the end of closing of the first injector on the first injection event in the averaging. In any or all of the preceding examples, additionally or optionally, the method further comprises learning a fuel mass error of the second fuel injector based on the estimated average fuel rail pressure and a fuel rail pressure sensed after the scheduled injection event; and adjusting subsequent engine fueling based on the learned injector error. In any or all of the preceding examples, additionally or optionally, the predicted change includes identifying the pressure altering engine events based on engine and fuel pump configuration. In any or all of the preceding examples, additionally or optionally, the fuel injectors of the engine are direct fuel injectors and the high pressure pump is a high pressure direct injection fuel pump.

Another example method for an engine comprises: operating in a first mode including estimating an average fuel rail pressure for a scheduled injection event at a fuel injector as a moving average over a pressure cycle since a last injection event at the given injector; and operating in a second mode including estimating the average fuel rail pressure for the scheduled injection event based on an average fuel rail pressure sampled during a quiet period of an earlier injection at another injector, and predicted injection events and fuel pump stroke events occurring between the earlier injection event and the scheduled injection event. In any or all of the preceding examples, additionally or optionally, the method further comprises, in each of the first and second mode, adjusting a pulse-width commanded to the given fuel injector at the scheduled injection event based on the estimated average fuel rail pressure. In any or all of the preceding examples, additionally or optionally, the method further comprises, in each of the first and second mode, learning a fuel mass error of the given fuel injector based on the estimated average fuel rail pressure and a fuel rail pressure sensed after the scheduled injection event; and adjusting a transfer function of the given fuel injector to converge the fuel mass error of the given fuel injector towards a common fuel mass error across all fuel injectors of the engine. In any or all of the preceding examples, additionally or optionally, the method further comprises, operating in the first mode responsive to pressure based injector balancing conditions not being met, and operating in the second mode responsive to injector balancing conditions being met.

In any or all of the preceding examples, additionally or optionally, the method further comprises transitioning from the first mode to the second mode responsive to a decrease in engine speed. In any or all of the preceding examples, additionally or optionally, the given fuel injector and the another fuel injector are each direct fuel injectors, and wherein while operating in each of the first and second mode, a cam lobe actuated high pressure direct injection fuel pump is enabled. In any or all of the preceding examples, additionally or optionally, during the first mode, the pressure cycle includes at least one stroke of each cam lobe of the high pressure direct injection fuel pump. In any or all of the preceding examples, additionally or optionally, during the second mode, the estimating includes: predicting a decrease in the average fuel rail pressure sampled during the quiet period due to the injection events occurring between the earlier injection event and the scheduled injection event; and predicting an increase in the average fuel rail pressure sampled during the quiet period due to the fuel pump stroke events occurring between the earlier injection event and the scheduled injection event.

Another example engine system comprises: an engine having multiple engine cylinders, each with a corresponding direct fuel injector; a fuel system including a lift pump and a cam actuated high pressure fuel pump for pressurizing a direct injection fuel rail; a pressure sensor coupled to the fuel rail; and a controller with computer-readable instructions stored on non-transitory memory that when executed cause the controller to: while the high pressure fuel pump is enabled, average fuel rail pressure sampled starting from a delay after start of opening of a first injector on an injection event to a start of opening of a second injector on an immediately subsequent injection event; predict one or more injection events and pump stroke events between the averaging and a future scheduled injection event at a third injector; update the average fuel rail pressure based on pressure changes associated with each of the predicted one or more injection events and pump stroke events; and command a pulse-width to the third injector at the scheduled injection event as a function of the updated average fuel rail pressure. In any or all of the preceding examples, additionally or optionally, the controller includes further instructions to update the average fuel rail pressure by decreasing the fuel rail pressure by a factor for each predicted injection event occurring between the averaging and the future scheduled injection event; and increasing the fuel rail pressure by another factor for each predicted pump stroke event occurring between the averaging and the future scheduled injection event.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term “approximately” is construed to mean plus or minus five percent of the range unless otherwise specified.

The following claims particularly point out certain combinations and sub-combinations regarded as novel and non-obvious. These claims may refer to “an” element or “a first” element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:

operating in a first mode including estimating an average fuel rail pressure for a scheduled injection event at a fuel injector as a moving average over a pressure cycle since a last injection event at the given injector; and operating in a second mode including estimating the average fuel rail pressure for the scheduled injection event based on an average fuel rail pressure sampled during a quiet period of an earlier injection event at another injector, and predicted injection events and fuel pump stroke events occurring between the earlier injection event and the scheduled injection event.

2. The method of claim 1, further comprising, in each of the first and second modes, adjusting a pulse-width commanded to the given fuel injector at the scheduled injection event based on the estimated average fuel rail pressure.

3. The method of claim 2, further comprising, in each of the first and second modes, learning a fuel mass error of the given fuel injector based on the estimated average fuel rail pressure and a fuel rail pressure sensed after the scheduled injection event; and adjusting a transfer function of the given fuel injector to converge the fuel mass error of the given fuel injector towards a common fuel mass error across all fuel injectors of the engine.

4. The method of claim 1, further comprising operating in the first mode responsive to pressure based injector balancing conditions not being met, and operating in the second mode responsive to pressure based injector balancing conditions being met.

5. The method of claim 2, further comprising transitioning from the first mode to the second mode responsive to a decrease in engine speed.

6. The method of claim 1, wherein the given fuel injector and the another fuel injector are each direct fuel injectors, and wherein while operating in each of the first and second modes, a cam lobe actuated high pressure direct injection fuel pump is enabled.

7. The method of claim 6, wherein during the first mode, the pressure cycle includes at least one stroke of each cam lobe of the high pressure direct injection fuel pump.

8. The method of claim 1, wherein during the second mode, the estimating includes:

predicting a decrease in the average fuel rail pressure sampled during the quiet period due to the injection events occurring between the earlier injection event and the scheduled injection event; and predicting an increase in the average fuel rail pressure sampled during the quiet period due to the fuel pump stroke events occurring between the earlier injection event and the scheduled injection event.

* * * * *